US005855226A

United States Patent [19]

Palmer

[11] Patent Number: 5,855,226

[45] Date of Patent: Jan. 5, 1999

[54] VALVE ACTUATOR

[76] Inventor: Thomas W. Palmer, Box 638, Fulshear, Tex. 77441

[21] Appl. No.: 643,059

[22] Filed: May 2, 1996

[51] Int. Cl.$^6$ .................................................... F16K 31/14

[52] U.S. Cl. ............................... 137/596.18; 137/596.14; 251/28; 251/31

[58] Field of Search ................................ 251/28, 31, 14, 251/29; 137/596.14, 596.17, 596.18

[56] References Cited

U.S. PATENT DOCUMENTS

| | | | |
|---|---|---|---|
| 2,743,897 | 5/1956 | Elliott et al. . | |
| 3,068,898 | 12/1962 | Meddock | 137/596.14 X |
| 3,905,393 | 9/1975 | Hartwig | 137/596.14 |
| 4,380,325 | 4/1983 | Palmer . | |
| 5,487,527 | 1/1996 | Eggleston . | |

OTHER PUBLICATIONS

"E–I–M Valve Controls Catalog G 263," E–I–M Company, 1963.

"Kepner Hydraulic & Pneumatic Valves," Kepner Products Company, particularly the Kepsel Cartridge type Valve Insert, 1984.

"Pending U.S. Patent Application Ser. No. 08/273,406 filed Jul. 11, 1994 entitled Valve Actuator" and co–owned with this application.

*Primary Examiner*—Kevin Lee

*Attorney, Agent, or Firm*—Guy McClung

[57] ABSTRACT

A selector valve system has been invented for selectively operating a motor for selectively actuating a main line valve on a pipeline, gas flowing through the pipeline, the system having, in one aspect, a body, a first poppet valve mounted on a first channel through the body, a second poppet valve mounted in a second channel through the body, a first limit valve for controlling flow of a portion of the gas to the first poppet valve so that upon such gas flowing to the first poppet valve the first poppet valve is actuated to permit gas flow to the motor to open the main line valve, and a second limit valve for controlling flow of a portion of the gas to the second poppet valve so that upon such gas flowing to the second poppet valve the second poppet valve is actuated to permit gas flow to the motor to close the main line valve. In one aspect the poppet valves are O-ring-saving cartridge valves.

6 Claims, 7 Drawing Sheets

FIG. 5
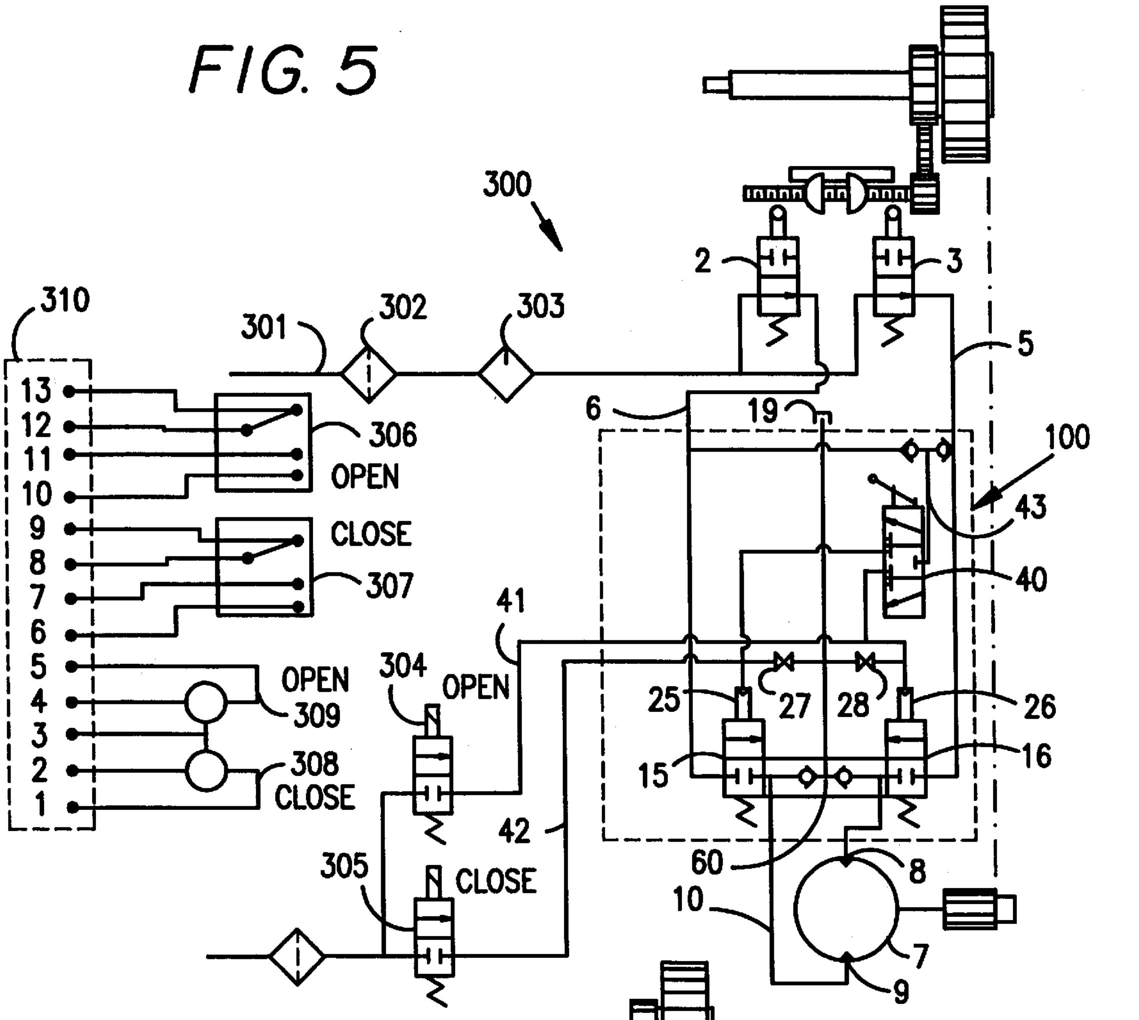
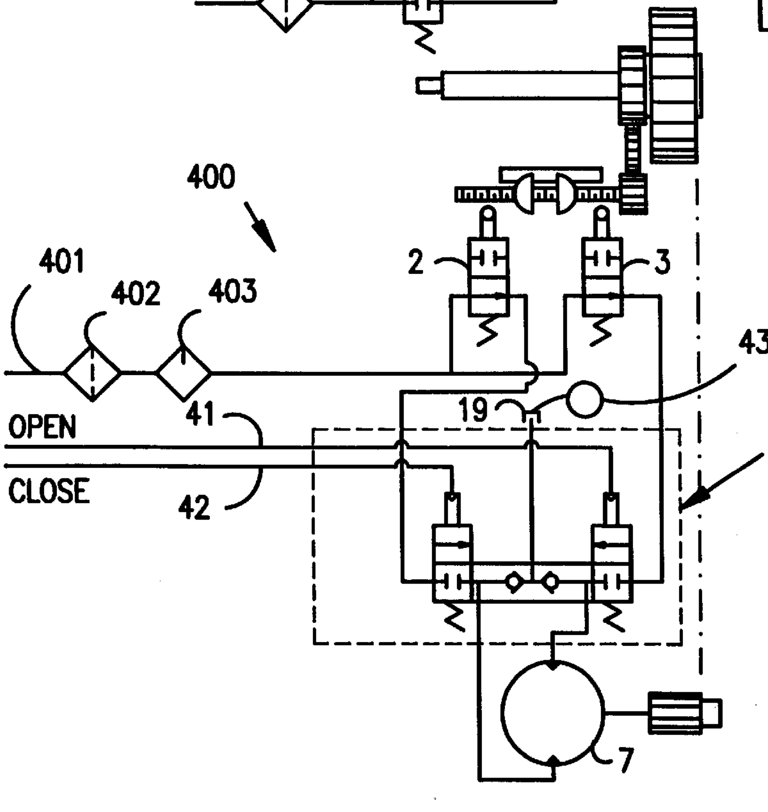
FIG. 6

VALVE ACTUATOR

BACKGROUND OF THE INVENTION

1. Field of the Invention

This invention is directed to gas operated valve actuators and to valve systems with such operators.

2. Description of Related Art

Certain prior art gas-operated valve actuators use O-ring seals in a variety of locations. One example of such a system is shown in U.S. Pat. No. 2,743,897. A problem is encountered when these O-rings are sheared, e.g. by a moving valve spool forcing an O-ring against a projection thread, slot, keyway, spline, corner, edge, port or angled surface, particularly when an O-ring has expanded due to heat or by gas permeation. Sheared O-rings result in a variety of unwanted results, including line pressure gas leaking to a vent or exhaust which then makes it impossible for the actuator to operate the main valve. Leaking gas also pollutes the environment.

A variety of attempts have been made to overcome the O-ring shear problem, including: adding a chamfer to edges contacting or contacted by an O-ring; using O-rings made of relatively harder material; and use of a "floating groove" so that sealing is accomplished by peripheral squeezing applied to surface of the O-rings outside circumference as it enters the bore of the spool valve body and gas pressure moves the O-ring into facial contact with the wall of the groove. Even with the use of a floating groove, O-ring dimensions change, gas permeates the O-rings, gas trapped in an O-ring expands rapidly changing O-ring size, and O-rings swell due to a reaction to ingredients in the gas (e.g. additives, corrosion inhibitors, etc.) or lubricating oils. O-rings fail due to a lack of lubrication and the inability of O-rings to adjust to extremely low temperatures.

The conditions under which gas pipe line companies operate today are different from those in existence twenty to forty-five years ago when many of the actuators currently in use were first put into service. Environmental regulations today call for as little discharge of natural gas into the atmosphere as possible. Fines for uncontrolled discharges can be very costly. All leaks must be held to a minimum. Compressor stations are becoming fully automated with only maintenance personnel on duty in the daytime five days a week. New government regulations are expected regarding main line break protection. In the past there has been automatic system protection or automatic systems that were used that reacted to a rate of change of pressure which closed the main line acutated valve. No provisions were available to re-open the main line unless operating personnel were dispatched to the main line valve. Current planning is to equip the pipe line system with more instrumentation so a central dispatcher knows everything occuring on the system and has the ability to close and re-open all critical valves. To do this, the existing gas motor powered valve actuators must be modified with remote control devices that are reliable and leak free.

SUMMARY OF THE PRESENT INVENTION

The present invention, in one embodiment, discloses a pipeline valve system and a gas-operated valve actuator for selectively operating a gas powered motor to open and close a main line valve which controls gas flow in a main conduit of the pipeline. One actuator according to the present invention employs cartridge valves in which O-ring seal shearing and damage are inhibited or prevented. One such actuator has "open" and "close" circuits for selectively opening and closing the main line valve, each circuit including an O-ring saving cartridge valve operable by line pressure gas to open to permit power gas to flow to the motor to open or close the main line valve. Gas flow to a piston which is moved to operate one of the cartridge valves is controlled by a manually operable switching valve, a remote-controlled pilot system, or both. Limit valves control the flow of line power gas to the actuator and shut flow off when the main valve has been opened (or closed).

In one aspect the present invention provides a selector valve system for a gas operated valve actuator which replaces an existing assembly but requires no modifications to the actuator. Such a system is substantially leak-free and can accept a plurality of automation control systems. Such a system fits existing motors, connects to existing limit valves, and has an exhaust gas connection which does not require modification. A manual operator is provided with a hands-off (dead man) feature. The system is designed so that a pneumatic operating pilot signal can be fitted to open or close the actuator. Optional devices make it possible to use low pressure (e.g. 100 psi or lower, e.g. 65 psi) instrument air where required.

Available poppet valves plug or unplug their openings by axial motion of a valve member. The addition of a seal ring provides a leak tight seal, and when properly designed, a seal is not sheared, damaged, or displaced. There are no sharp edges for an O-ring to pass over as with a spool type valve. Dimensional changes in the seal O-ring do not affect the function of the poppet valve. Lubrication is not as much of a factor, nor is temperature. Certain commercially available cartridge type valve inserts which use a flexible seal seat design are one example of a zero leakage O-ring seal poppet valve that handles high pressure, provides full flow in both directions, and a positive leak tight sealing. In one embodiment the present invention uses these cartridge valve insert units mounted in specially machined parts. Two such valves, one for each direction of travel, are used to control the flow of line pressure gas from each of two limit valves. The line pressure forces the valves to the close direction, and this is overcome by pistons in a cylinder area machined in the valve body. When either of these cylinders is supplied line pressure, it provides axial motion to the insert poppet valve, which allows line pressure gas to flow through the insert poppet valve. This same line pressure gas then forces an additional, larger insert poppet valve, located in another area of the valve body, to close. This larger insert poppet valve is mechanically connected to still another larger insert poppet valve; this other insert poppet valve moves to its fully open position. The line pressure gas then travels to the gas motor where it rotates the motor and then travels to the larger insert poppet valve which has been forced open. Because this open valve is connected to the exhaust passage of the valve body, the now-used line pressure gas passes out an exhaust. This action continues until an actuator limit travel system which controls both limit valves and which is interconnected with the limit valves and with the motor (e.g. via a gear system) (e.g. as shown in U.S. Pat. No. 2,743,897 and U.S. Pat. No. 4,380,325 naming the present inventor as patentee which are both incorporated fully herein for all purposes in its entirety) shuts the limit valve.

Systems according to the present invention are controlled as described above using line pressure in its usually configuration; or larger pistons are used so that a lower fluid pressure (e.g. instrument air pressure) may be used.

In certain aspects, the present invention discloses selector valve systems for selectively operating a motor for selectively actuating a main line valve on a pipeline, the motor powered by fluid flowing therethrough, gas flowing through the pipeline, the system including a body, a first poppet valve mounted in a first channel through the body, the first channel in fluid communication with the motor, a second poppet valve mounted in a second channel through the body, the second channel in fluid communication with the motor, a first limit valve for controlling flow of a portion of the gas to the first poppet valve so that upon such gas flowing to the first poppet valve the first poppet valve is actuated to permit gas flow to the motor to power the motor to open the main line valve, and a second limit valve for controlling flow of a portion of the gas to the second poppet valve so that upon such gas flowing to the second poppet valve the second poppet valve is actuated to permit gas flow to the motor to power the motor to close the main line valve; such a system with manually operable control apparatus for selectively operating the first poppet valve and the second poppet valve; such a system wherein the manually operable control apparatus automatically returns to a fail-safe position at which the selector valve system is not operating when the manually operable control apparatus is not being manually operated; such a system wherein the manually operable control apparatus includes a manually operable switching valve and an exhaust channel through the body in fluid communication with an exhaust port, the exhaust channel in fluid communication with the motor, a first piston recess in fluid communication with the exhaust channel, a first piston channel in fluid communication with the first piston recess and in fluid communication with a manually operable switching valve, the manually operable switching valve for selectively controlling gas flow to the first piston channel, a first piston movably disposed in the first piston recess and movable by gas in the first piston recess to contact the first poppet valve, the manually operable control apparatus operable to permit gas to flow into the first piston recess, a second piston recess in fluid communication with the exhaust channel, a second piston channel in fluid communication with the second piston recess and the manually operable switching valve, the manually operable switching valve for selectively controlling gas flow to the second piston channel, a second piston movably disposed in the second piston recess and movable by gas in the second piston recess to contact the first poppet valve, the manually operable control apparatus operable to permit gas to flow into the second piston recess; such a system with a first orifice plate in the first piston channel for controlling gas flow to and from the first piston recess, and a second orifice plate in the second piston channel for controlling gas flow to and from the second piston recess; such a system with remote control apparatus remote from the selector valve system and interconnected therewith for selectively operating the first poppet valve and the second poppet valve; such a system with a third fluid channel in the body in fluid communication with the first channel and the second channel, an exhaust channel in the body in fluid communication with the third channel, the exhaust channel in fluid communication with an exhaust port through which gas may exit the selector valve system, and shuttle valve apparatus in the third fluid channel, the shuttle valve apparatus controlling fluid flow to the exhaust channel, the shuttle valve apparatus permitting gas that has passed through the motor to flow to the exhaust channel; such a system wherein the shuttle valve apparatus has a first shuttle poppet valve and a second shuttle poppet valve, and the first shuttle poppet valve and the second shuttle poppet valve interconnected by a connecting bar so that opening of one shuttle poppet valve closes the other; such a system with a movable cover movably mounted to the body for preventing access to the manually operable control apparatus, the movably cover releasably lockable to the body; such a system wherein the first poppet valve and the second poppet valve are O-ring-saving cartridge valves each with a flexible seal seat and a valve member that moves axially with respect to the flexible seal seat; such a system wherein the first shuttle valve and the second shuttle valve are O-ring-saving cartridge valves each with a flexible seal seat and a valve member that moves axially with respect to the flexible seal seat; such a system with a limit valve control system interconnected with the first limit valve and the second limit valve and with the motor so that upon completion of opening of the main valve gas flow to the motor ceases and upon completion of closing of the main valve gas flow to the motor ceases; such a system with an exhaust channel through the body in fluid communication with an exhaust port, the exhaust channel in fluid communication with the motor, and collection apparatus in fluid communication with the exhaust port for collecting gas exhausted from the body; such a system including the motor for selectively actuating the main line valve on the pipeline; such a system including the main line valve.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 5 is a schematic view of a system according to the present invention.

FIG. 6 is a schematic view of a system according to the present invention.

DESCRIPTION OF EMBODIMENTS PREFERRED AT THE TIME OF FILING FOR THIS PATENT

Figure 1:
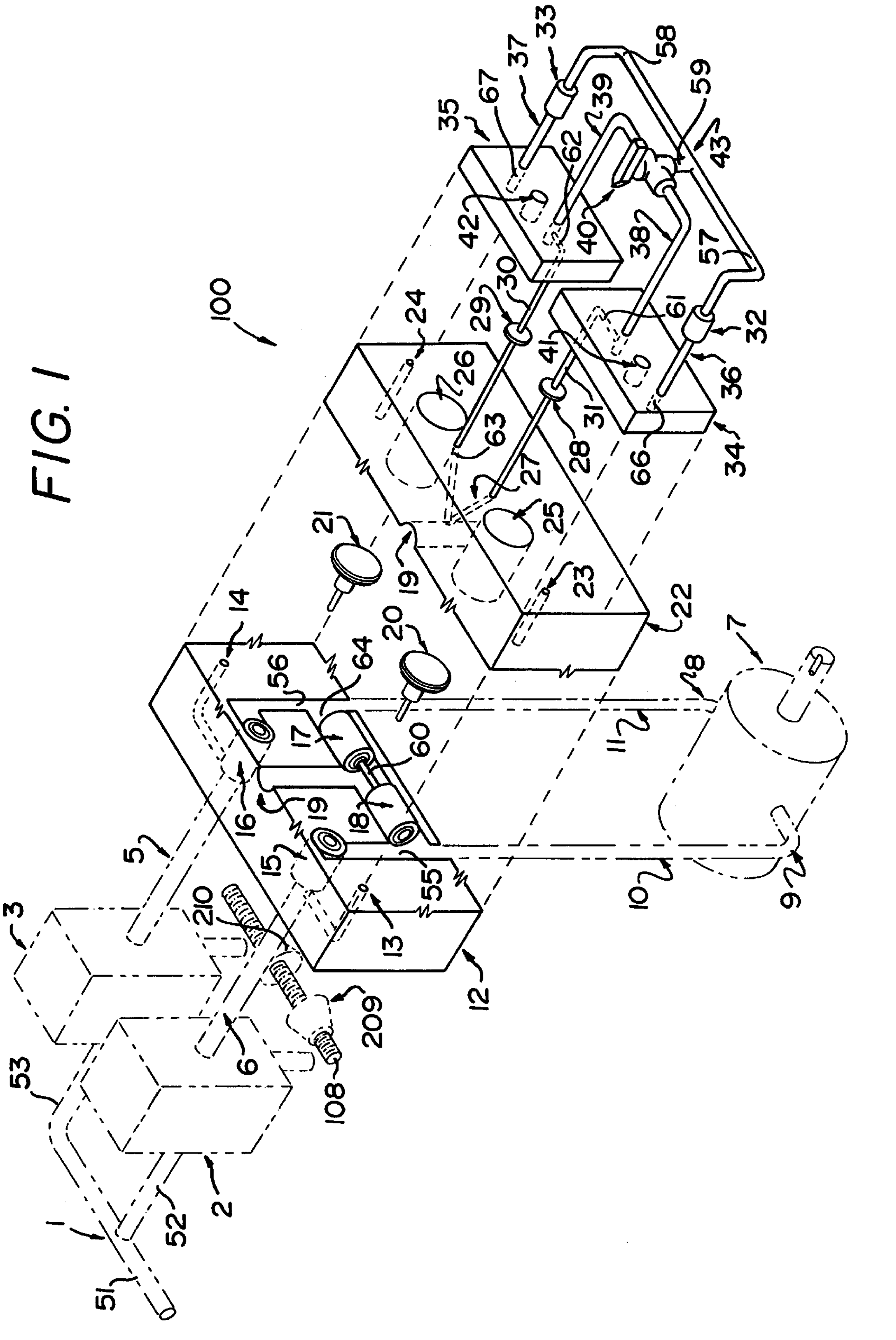
FIG. 1 is an exploded perspective view of a system according to the present invention.
Figure 7A:
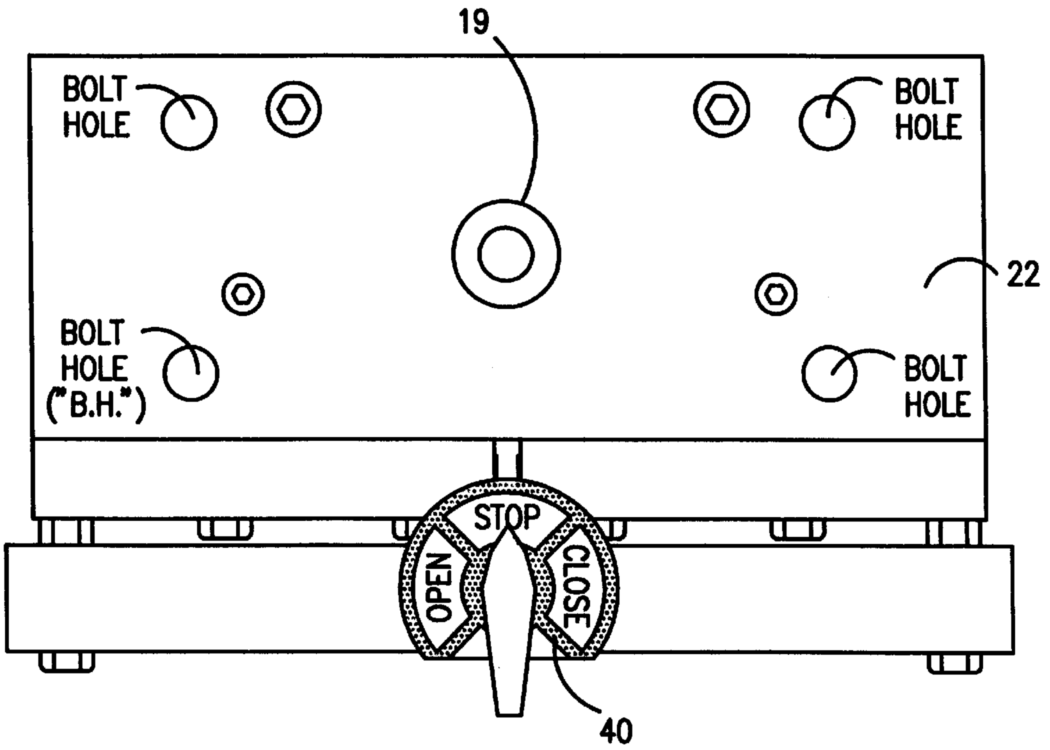
FIG. 7A is a top view of a body of the system of FIG. 1.
Figure 7B:
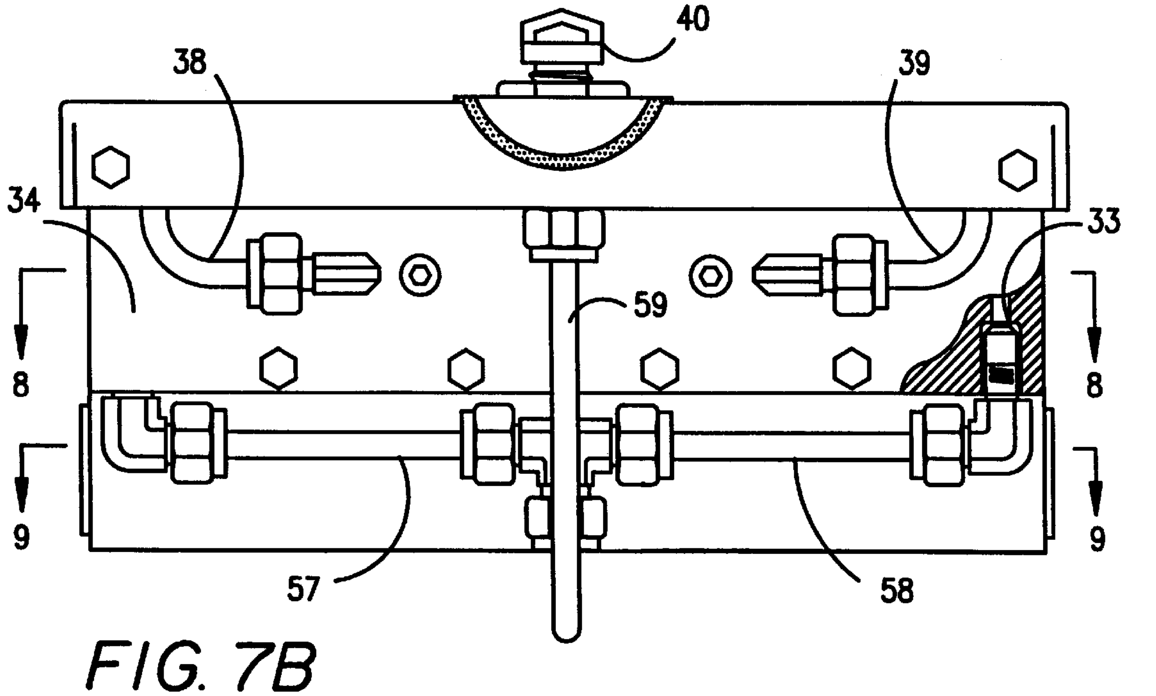
FIG. 7B is an end view of the system of FIG. 7A.

Referring now to FIGS. 1, 7A, and 7B in a valve control system 100 according to the present invention, gas under pressure from a gas line (in which gas flow is controlled by a main valve, not shown in FIG. 1; the main valve operable by a motor 7 in one of two directions to open or close the main valve) flows in a conduit 51 to a manifold 1 with branches 52 and 53. Gas flows in the branch 52 to a limit valve 2 which is normally open and in a branch 53 to a limit valve 3 that is normally open. The gas flows from the limit valve 2 through a line 6 to hold a valve member of a poppet valve 15 in position to close off flow to a line 10 interconnected with a motor 7 port 9 to the motor 7. The gas also flows from the limit valve 3 through a line 5 to hold a valve member of a poppet valve 16 in position to close off flow to a line 11 interconnected with a motor port 8 to the motor 7. The poppet valves 15 and 16 are positioned in recesses 85, 86 respectively in a body 12.

With the poppet valves 15 and 16 closing off the lines 10 and 11, respectively, the line gas flows through channels 13, 14, 23, 24, 36, 37, 66 and 67 through poppet valve inserts 32 and 33, (each containing a poppet valve) through branches 57 and 58 of a manifold 43, to a central line 59, and into a switching valve 40. The channels 23 and 24 are in a portion 22 of the housing 12. The channel 66 extends through a housing 34 and the channel 67 extends through a housing 35.

As shown in FIG. 1 the switching valve 40 controls flow from the lines 57 and 58, through the line 59, into lines 38 and 39. As shown in FIG. 1 the valve 40 is in the "stop" or middle position and the motor 7 is "off". With the switching valve 40 in the "close" position, gas flows through the line 38, through a channel 61, through a line 31, through an orifice plate 28, through a channel 27, to an exhaust vent channel 19 and to a cylindrical recess 25 in which is movably positioned a piston 20. Orifice plate 28 restricts flow so the cylindrical recess 25 fills with gas pressure. With the switching valve 40 in an "open" position (FIG. 2), gas flows through the line 39, through a channel 62, through a line 30, through an orifice plate 29, through a channel 63, to the exhaust vent channel 19 and to a cylindrical recess 26 in which is movably disposed a piston 21. The pistons 20, 21 are movable by gas pressure to operate the poppet valves 15 and 16, respectively.

Valves 17 and 18 interconnected by a bar 60 move in a channel 64 to control flow in the lines 10 and 11 and to the exhaust vent channel 19. A travel limit cam system 4 acts on the limit valves 2 and 3 (e.g. as described on my previous U.S. Pat. No. 4,380,325). The poppet valve inserts 32 and 33 check the feedback of gas to the limit valves 2 and 3 respectively.

The orifice plates are metal or plastic disks ½" in diameter and 1/16" thick with a 0.040" hole. The hole in the housing is 3/16" diameter and the supply line is ¼" tubing. Therefore the cylindrical recesses 25 and 26 are supplied line pressure gas e.g. at 400 to 1440 p.s.i.g., via a ¼" tube and flow out of the recess is restricted to a 0.040" opening. The orifice plates 28 and 29 open to vent gas supplied to the poppet valves 15 and 16, respectively and they open to exhaust gas from the cylinders 25, 26 respectively, to allow the pistons 20 and 21 to retract so that the poppet valves 15 and 16 move back to close off the lines 10 and 11.

A port 41 in the housing 34 and a port 42 in the housing 35 provide fluid access for a remote pilot system (e.g., but not limited to, ten feet away or more) which provides an alternative to the manual pilot system that includes the manifold 43, switching valve 40, etc. A single system has both pilot systems, manual and remote. The ports 41 and 42 are in fluid communication with (the cylindrical recesses 25, 26. They can be supplied with line pressure gas supplied from a pilot system as an alternative way to selectively activate the system.

Figure 2:
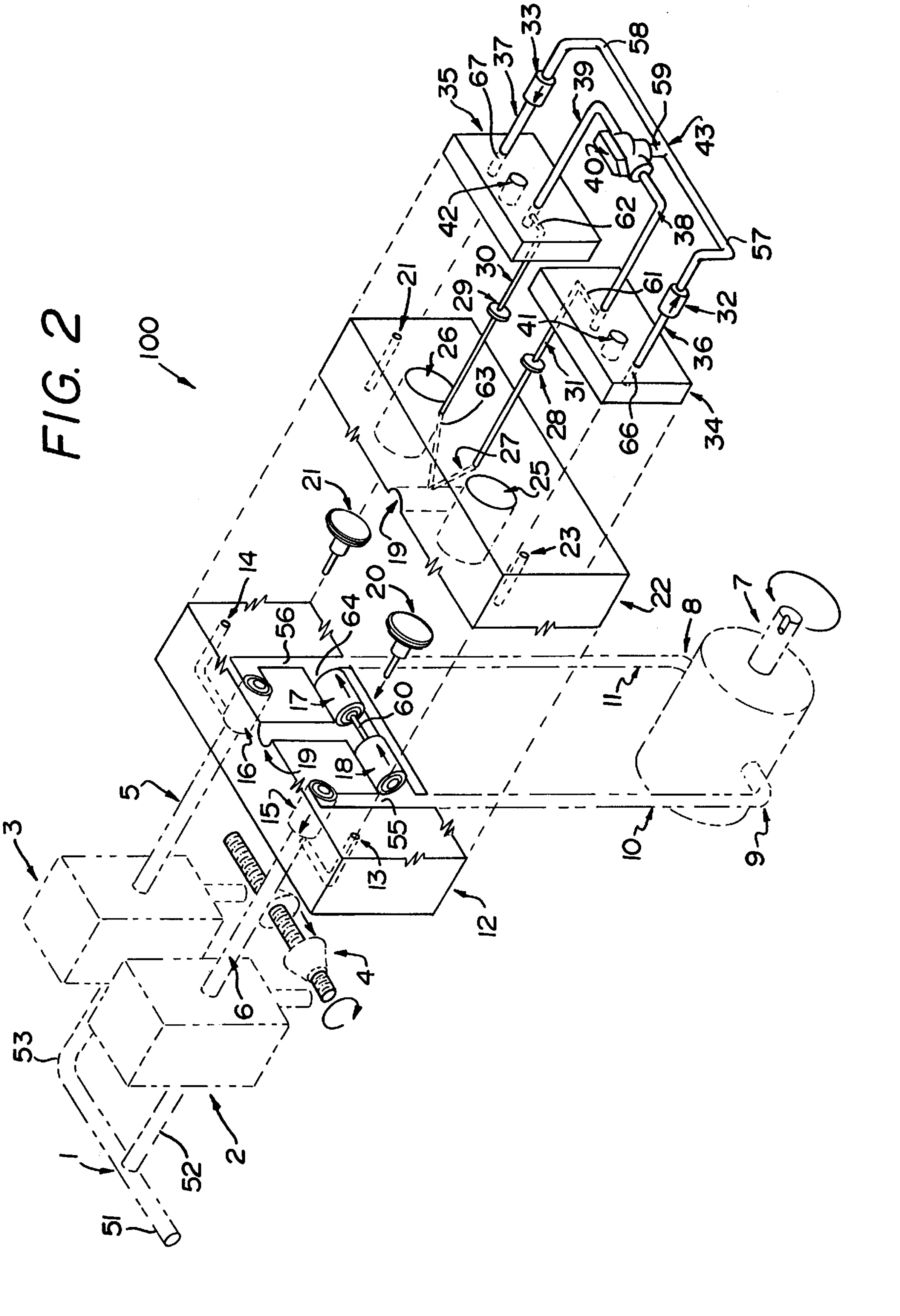
FIG. 2 is an exploded perspective view of the system of FIG. 1.

As shown in FIG. 2, the switching valve 40 has been manually operated so that line pressure gas flows through the poppet valve insert 32, the lines 57 and 59 and to the cylindrical recess 25 moving the piston 20 to force the poppet valve 15 open allowing line pressure gas to pass through the poppet valve 15 through the channel 55, through the line 10, to the motor port 9, and to the motor 7 to begin opening the main line valve. Simultaneously, the line gas pressure operates the poppet valve insert 18 to prohibit flow to the exhaust vent channel 19. Due to the interconnection of the poppet valve inserts 18 and 17 by the bar 60, at the same time the poppet valve insert 17 is operated to permit flow through it to the exhaust vent channel 19. As line gas works to run the motor 7, its pressure is reduced and it exits the motor 7 through the motor port 8 at a lower pressure (e.g. in one aspect, a drop from typical 500 p.s.i.g. supply) to an exhaust of 75 p.s.i.g.) than that at which it entered the motor 7. The poppet valve insert is made so that it will not close in response to this lower pressure gas flowing to it through the line 11 and the channel 56. This gas, however, does pass through the poppet insert valve 17 to the exhaust vent channel 19 from which it is exhausted to the atmosphere, to a collection system, or to a filtration system (e.g. as a collection and/or filtration system 430 shown in FIG. 6). The motor 7 continues to run until the travel cam system 4 moves to close the limit valve 2 at which time the flow of line pressure gas ceases and gas remaining in the cylinder recess 25 is vented through the exhaust vent channel 19. When the motor 7 has opened the main line valve, gas is exhausted from the valve actuator system 100.

As an alternative, gas under pressure applied to the ports 41 or 42 operates the pistons 20 and 21, respectively, and the system 100 then acts as described above.

Figure 3:
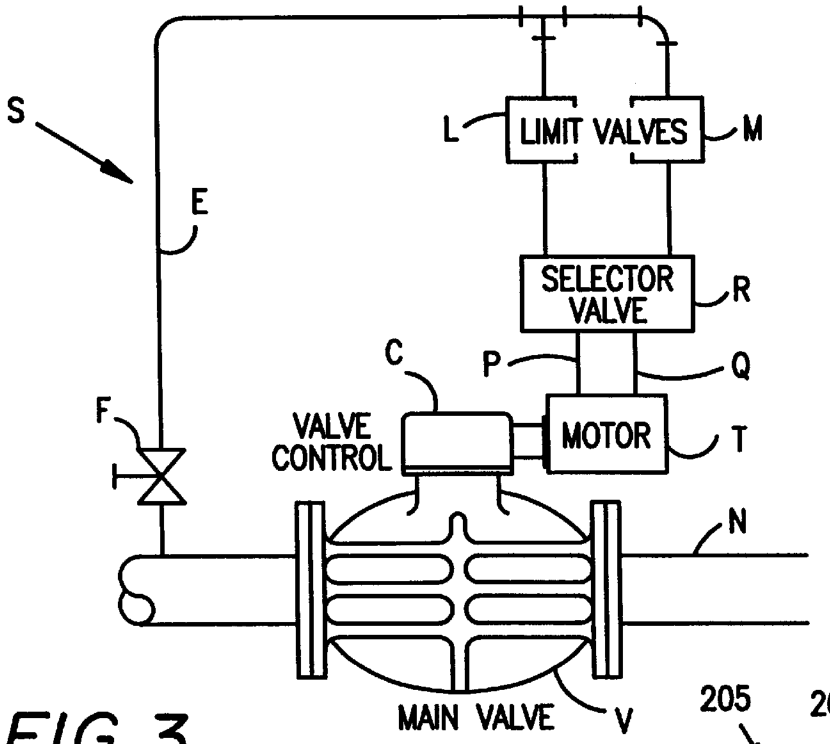
FIG. 3 is a schematic view of a system according to the present invention.

FIG. 3 shows a valve control system 5 according to the present invention for controlling a main valve V which itself controls flow through a pipeline P. Limit valves L and M (like items, 2, 3, FIG. 1), powered by gas from the pipeline N in a line E, control the flow of line power gas to a selector valve R (like system 100, FIG. 1; and which may be any selector valve according to the present invention as shown and/or described herein). The selector valve R is operable to provide power to a motor T (like motor 7, FIG. 1) through one of two lines P or Q (like lines 5, 6, FIG. 1) to open or close the main valve V. The motor M interfaces with a valve control C for the main valve V. A valve F controls flow in the line E.

Figure 4:
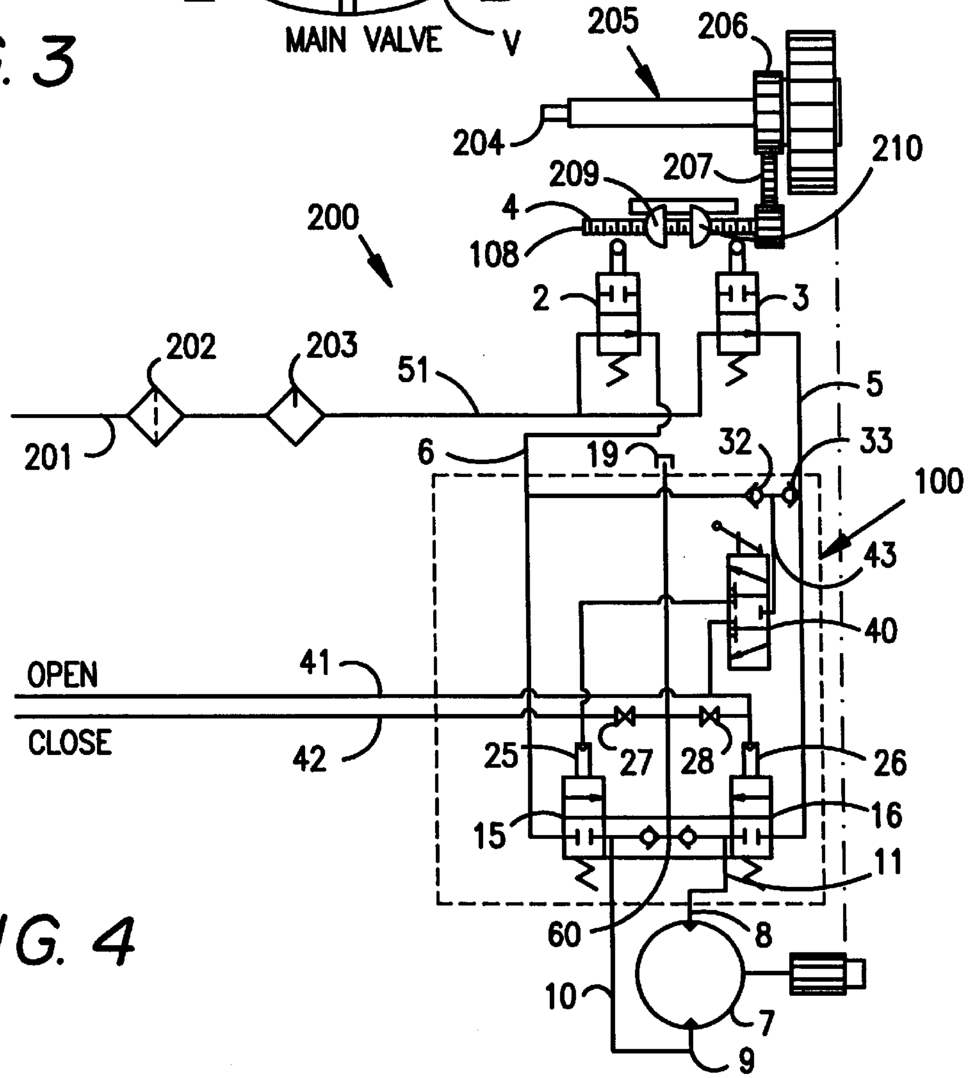
FIG. 4 is a schematic view of a system according to the present invention.

FIG. 4 shows schematically a system 200 with a valve control system 100 (see FIG. 1) for selectively operating a motor on a main line valve (not shown) (numerals as in other figures indicate like items). Power gas from a main pipeline enters in a line 201, flows through a filter 202 and a lubricator 203 (for lubricating a valve actuator motor) to limit valves 2 and 3. A direct drive handwheel shaft 204 is connected to the main pipeline valve input shaft 205. This shaft 204 also has a gear 206 which drives timing gears 207 to match the required turns of the main pipeline valve. The timing gears 207 drive a threaded shaft 108 on which cams 209 and 210 are fitted. These cams close the normally open limit valves 2 and 3.

FIG. 5 shows a system 300, like the system 200, but with an alternative remote pilot operating system (numerals as in other figures indicate like items). Power gas from a main pipeline is supplied in a line 301, through a filter 302 and lubricator 303 to the limit valves 2 and 3. A first solenoid switch 304 and a second solenoid switch 305 provide an alternative control apparatus for selectively operating a motor on a main line valve. The system 300 has travel limit electrical switches 306, 307 mounted on each limit valve 2 and 3, a "close" solenoid valve 308 and an "open" solenoid valve 309. The wires for these items are terminated inside a junction box 310.

FIG. 6 shows a system 400, like the systems 200 and 300 (numerals as in other figures indicate like items), but with no solenoid-switch alternative system and with no dead-man pilot control. The system 400 is for use when relatively lower pressure line power gas (e.g. less than 100 psi, e.g. 65 psi) is available. Line power gas from a main pipeline is supplied in a line 401, through a filter 402 and a lubricator 403, to a system 410 (like the system 100 with the above-described exceptions).

Figure 8:
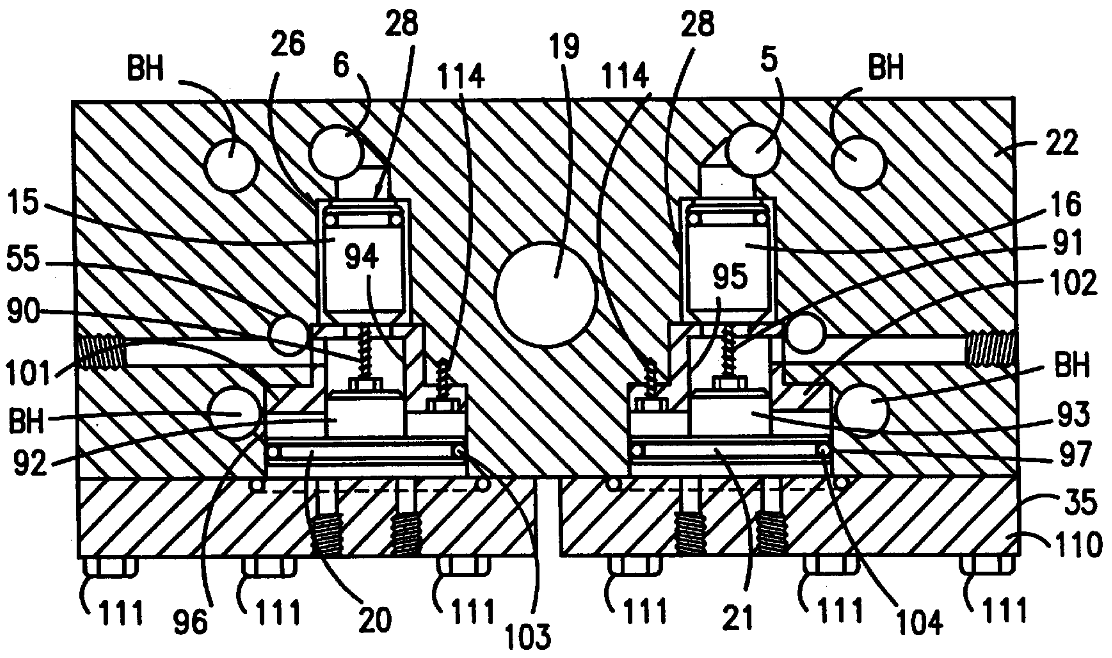
FIG. 8 is a cross-sectional view along line 8—8 of FIG. 7.

FIG. 8 shows the interface of the poppet valves 15 and 16 of the system 100 with the pistons 20 and 21, respectively. The pistons 20, 21 have pushers 90, 91 respectively, projecting from shafts 92, 93 respectively for co-acting with the poppet valves 15, 16. The shafts 92, 93 move in openings 94, 95 in the body 22 and in chambers 96, 97. Retainers 101, 102 guide the shafts. O-rings 103, 104 seal the piston-housing interfaces. A cover 110 is secured over the body 22 with bolts 111. Screws 114 secure the retainers 101, 102 to the body 22.

Figure 9:
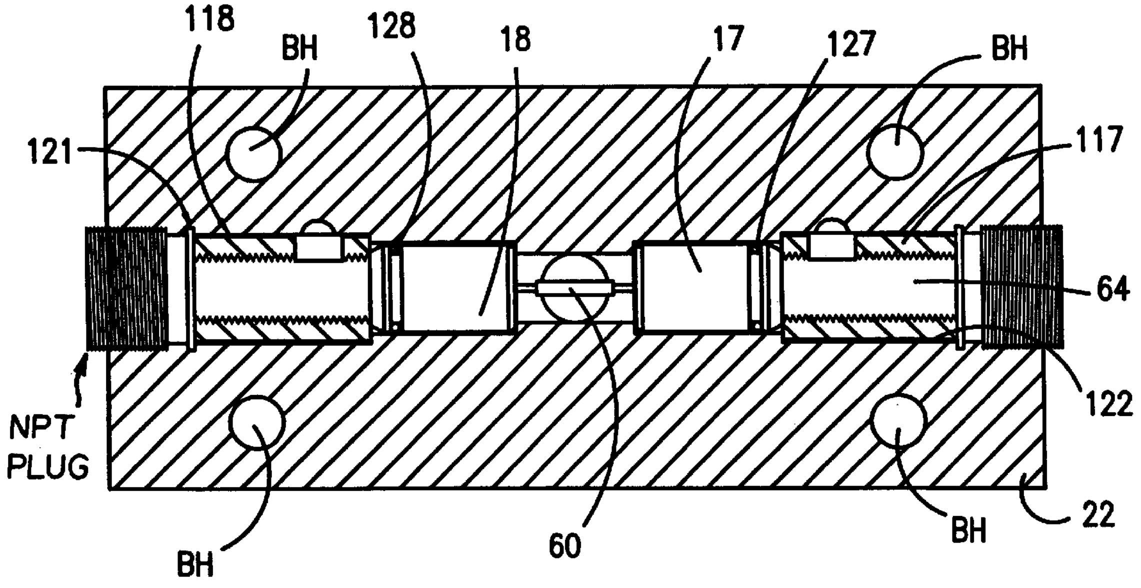
FIG. 9 is a cross-sectional view along line 9—9 of FIG. 7.

FIG. 9 shows the shuttle check valves 17, 18 held in the recess 64 by snap rings 121, 122. Spacers 117, 118 facilitate snap ring emplacement. O-rings 127, 128 respectively seal the valve-body interfaces. Snap rings 121, 122 retain the check valves 17, 18 in place.

Figure 10:
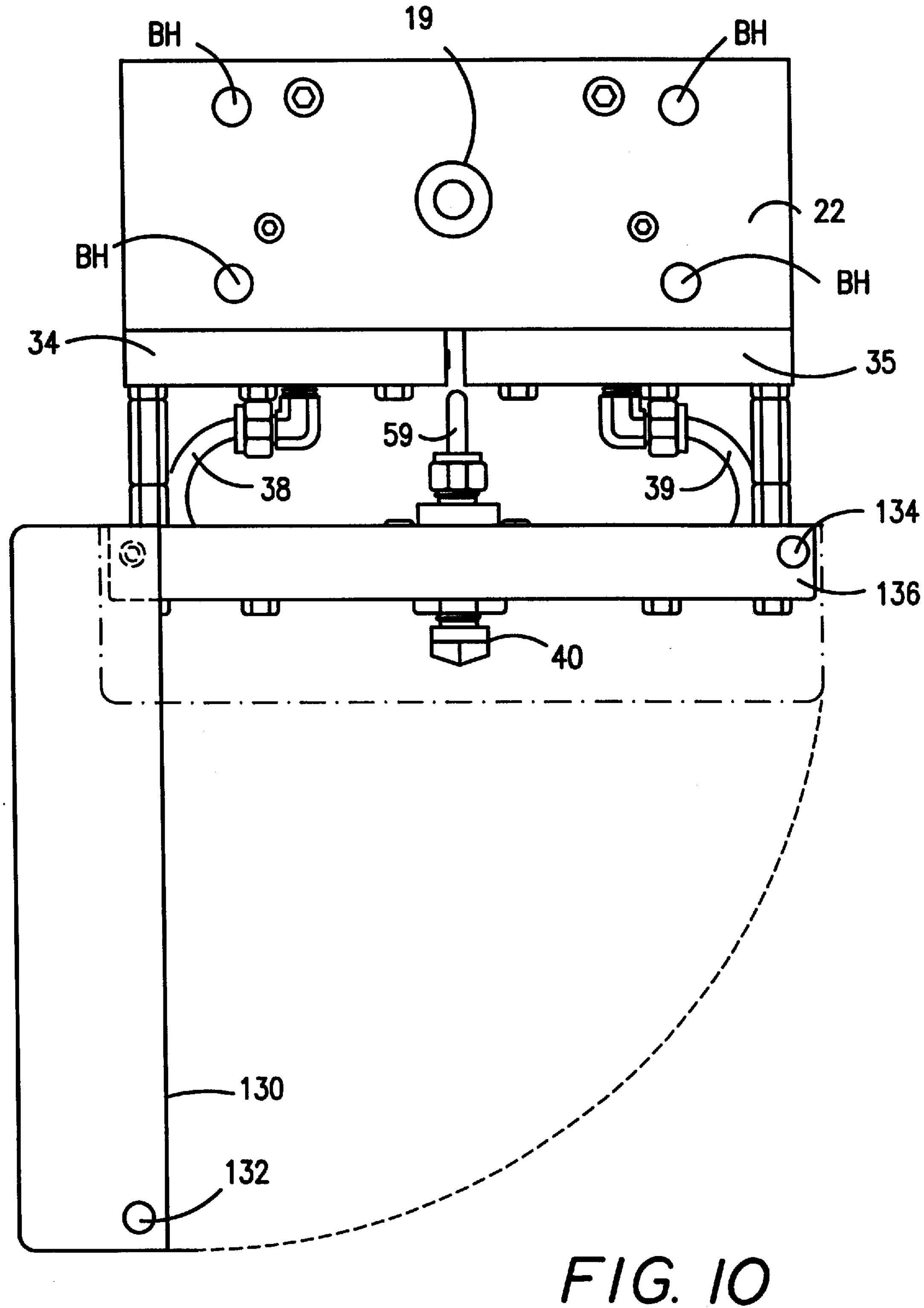
FIG. 10 is a top view of part of the system of FIG. 1.

FIG. 10 shows a movable lockable cover 130 for the front of the system 100. A hole 132 in the cover 130 is moved adjacent a hole 134 in a plate 136. A lock may be placed through both holes to prevent access to the various items and controls at the front of the system.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps.

What is claimed is:

1. A selector valve system for selectively operating a motor for selectively actuating a main line valve on a pipeline, the motor powered by fluid flowing therethrough, gas flowing through the pipeline, the system comprising:

a body;

a first poppet valve mounted in a first channel through the body, the first channel in fluid communication with the motor;

a second poppet valve mounted in a second channel through the body, the second channel in fluid communication with the motor;

a first limit valve for controlling flow of a portion of the gas to the first poppet valve;

the first limit valve and the second limit valve normally open permitting gas flow to bias the first poppet valve and the second poppet valve, respectively, closed;

bypass means interconnected with the first poppet valve for selectively activating the first poppet valve to an open position to permit gas flow to the motor to power the motor to open the main the line valve; and the bypass means interconnected with the second poppet valve for selectively activating the second poppet valve to an open position to permit gas flow to the motor to power the motor to close the main line valve.

2. The selector valve system of claim 1 further comprising:

remote control apparatus remote from the selector valve system and interconnected therewith for selectively operating the first poppet valve and the second poppet valve.

3. The selector valve system of claim 1 further comprising:

a third fluid channel in the body in fluid communication with the first channel and the second channel;

an exhaust channel in the body in fluid communication with the third fluid channel, the exhaust channel in fluid communication with an exhaust port through which gas may exit the selector valve system; and shuttle valve apparatus in the third fluid channel, the shuttle valve apparatus controlling fluid flow to the exhaust channel, the shuttle valve apparatus permitting gas that has passed through the motor to flow to the exhaust channel.

4. The selector valve system of claim 3 further comprising: the shuttle valve apparatus comprising:

a first shuttle poppet valve; and a second shuttle poppet valve, and the first shuttle poppet valve and the second shuttle poppet valve interconnected by a connecting bar so that opening of one shuttle poppet valve closes the other.

5. The selector valve system of claim 1 further comprising:

a limit valve control system interconnected with the first limit valve and the second limit valve and with the motor so that upon completion of opening of the main valve gas flow to the motor ceases and upon completion of closing of the main valve gas flow to the motor ceases.

6. The selector valve system of claim 1 further comprising:

an exhaust channel through the body in fluid communication with an exhaust port, the exhaust channel in fluid communication with the motor; and collection apparatus in fluid communication with the exhaust port for collecting gas exhausted from the body.

* * * * *